US011398974B2

(12) United States Patent
Yan (10) Patent No.: US 11,398,974 B2
(45) Date of Patent: Jul. 26, 2022

(54) ETHERNET-BASED MULTI-CHANNELS SWITCH, CHANNEL ARBITRATION METHOD AND COMMUNICATION METHOD THEREOF

(71) Applicant: Beijing NE-net Technology Co. Ltd., Beijing (CN)

(72) Inventor: Xiaofeng Yan, Fremont, CA (US)

(73) Assignee: BEIJING NE-NET TECHNOLOGY CO. LTD., Beijing (CN)

( * ) Notice: Subject to any disclaimer, the term of this patent is extended or adjusted under 35 U.S.C. 154(b) by 386 days.

(21) Appl. No.: 16/613,412

(22) PCT Filed: May 17, 2018

(86) PCT No.: PCT/CN2018/087328
§ 371 (c)(1),
(2) Date: Nov. 13, 2019

(87) PCT Pub. No.: WO2018/210310
PCT Pub. Date: Nov. 22, 2018

(65) Prior Publication Data
US 2020/0076723 A1 Mar. 5, 2020

(30) Foreign Application Priority Data

May 19, 2017 (CN) .......................... 201710357161.X (51) Int. Cl.
*H04L 45/16* (2022.01)
*H04L 47/50* (2022.01)
(Continued)

(52) U.S. Cl.
CPC .............. *H04L 45/16* (2013.01); *H04L 47/50* (2013.01); *H04L 49/201* (2013.01);
(Continued)

(58) Field of Classification Search
CPC ....... H04L 45/16; H04L 47/50; H04L 49/201; H04L 49/254; H04L 49/30; H04L 49/351
See application file for complete search history.

(56) References Cited

U.S. PATENT DOCUMENTS

2017/0048145 A1* 2/2017 Shiraki ................... H04L 47/52

FOREIGN PATENT DOCUMENTS

| CN | 1762133 A | 4/2006 |
|---|---|---|
| CN | 102195858 | 9/2011 |

(Continued)

*Primary Examiner* — Siming Liu
(74) *Attorney, Agent, or Firm* — Treasure IP Group, LLC (57) ABSTRACT

The present invention provides methods and apparatuses for determining a liquid level inside a container by using an effective capacitance associated with one or more sense electrodes that are located inside the container. Embodiments may support different types of liquids, including water, and support different electrical appliances, including electric kettles, coffee makers, and water treatment appliances having a non-transparency housing such as stainless steel and black color Lucite or glass that cannot directly indicate the water level. A value of capacitance characteristic associated with a sensing electrode is determined. The water level may be displayed to the user on any kind of electronic panel, e.g., liquid crystal display (LCD), light emitting diode (LED) display, or vacuum fluorescent display (VFD). Also, a correction factor may be applied to a determined capacitance associated with a sensing electrode to compensate for the operating temperature of the sensor electrode and the liquid.

18 Claims, 5 Drawing Sheets

(51) Int. Cl.
*H04L 49/201* (2022.01)
*H04L 49/253* (2022.01)
*H04L 49/00* (2022.01)
*H04L 49/351* (2022.01)

(52) U.S. Cl.
CPC ............ *H04L 49/254* (2013.01); *H04L 49/30* (2013.01); *H04L 49/351* (2013.01)

(56) References Cited

FOREIGN PATENT DOCUMENTS

| CN | 104717159 A | 6/2015 |
| CN | 105119846 | 12/2015 |
| CN | 105933162 A | 9/2016 |
| CN | 107248963 | 10/2017 |

\* cited by examiner

ETHERNET-BASED MULTI-CHANNELS SWITCH, CHANNEL ARBITRATION METHOD AND COMMUNICATION METHOD THEREOF

CROSS REFERENCE TO RELATED APPLICATION

This application claims priority to a PCT application PCT/CN2018/087328, filed on May 17, 2018, which in turn takes priority of Chinese Application No. 201710357161.X, filed on May 19, 2017. Both the PCT application and Chinese Application are incorporated herein by reference in their entireties.

TECHNICAL FIELD

The present disclosure relates to a switch, and more particularly to an Ethernet-based multi-channels switch, channel arbitration method and Communication Method thereof

BACKGROUND OF THE INVENTION

A common Ethernet switch working at the data link layer of an OSI network is a Network device which performs an Ethernet data frame forwarding based on recognition of MAC (Media Access Control, Media Access Control). A traditional Ethernet switch typically queues incoming data frames to forward them to a next switch or destination device.

However, in existing industrial control networks, a variety of data are transmitted therein, such as video data, audio data, control data, and so on. However, various networks often have different requirements for the reality of different data. For example, industrial networks often have higher requirements for the real-time of industrial control data than for some common data such as such as video data and calling data. In this way, on the one hand, if those video data or call data with lower real-time requirements often occupy a large amount of bandwidth, the transmission of the video data or call data will occupy the bandwidth required for transmission of high real data so that the transmission traffic per unit time of the data with real-time requirements will be reduced, which slows transmitting rate of the data with higher real-time requirements and results in delays in transmission. On the other hand, even in the case where a high priority is given to industrial control data with higher real-time requirements, since a large amount of normal data is being transmitted in the channel, such industrial control data has to wait for being transmitted successfully until the transmission of the normal data finishes. Especially when the industrial network is attacked or intruded by ordinary data attacking the industrial network from a normal port, the transmission path of the data link layer will be occupied for a long time by ordinary data attacking the industrial network from the normal port so that data with higher real-time requirements is blocked and cannot be transmitted, which causes significant transmission delays. Therefore, in order to ensure the real-time and security of the control data, an existing solution usually uses a dedicated network system to transmit control data, and another network system to transmit ordinary data at the same time. However, this solution which provides the two isolated network systems at the same time increases the cost of the industrial site and the difficulty of field operations and maintenance.

SUMMARY OF THE INVENTION

In order to eliminate the above problems in the data link layer of the existing Ethernet OSI, according to one aspect of the present disclosure, An Ethernet-based multi-channels switch is provided. The Ethernet-based multi-channels switch comprises: one or more access ports for user device; at least one pair of paired network link ports; a channel arbitration component, configured to determine a channel level to be occupied by a data frame based on the data frame received from a user device connected to a local access port or the higher channel level between the channel level of the source user device and the channel level of the destination device which are contained in the data frame received from a network link port and sequentially arrange the received data frame in a data queue in the channel with the determined channel level; and a routing decision component, configured to sequentially obtain a data frame of a data queue from each channel in order from high channel level to low channel level, judge the attribute of the data frame obtained from each level channel based on the routing information of the data frame, and determine the routing direction of the obtained data frame based on the attribute of the obtained data frame and the channel level associated with the obtained data frame.

The Ethernet-based multi-channels switch according to the present disclosure, wherein the channel arbitration component directly determines a channel level of a broadcast data frame and a channel level of an acknowledgement data frame for the broadcast data frame as the lowest channel level.

The Ethernet-based multi-channels switch according to the present disclosure, wherein the channel arbitration component directly determines a channel level of a broadcast data frame, a channel level of an acknowledgement data frame for the broadcast data frame, and a channel level of a subsequent confirmation data frame as the lowest channel level.

The Ethernet-based multi-channels switch according to the present disclosure, wherein the routing decision component judges that the attribute of a data frame received from the local access port is a network link port, and bilaterally routes the data frame to a pair of paired network link ports.

The Ethernet-based multi-channels switch according to the present disclosure, wherein the routing decision component judges that the attribute of a broadcast data frame received via one network link port of the at least one pair of paired network link ports is an access port for user device And the other network link port of the at least one pair of paired network link ports.

The Ethernet-based multi-channels switch according to the present disclosure, wherein the routing decision component judges that the attribute of a data frame received via one network link port of the at least one pair of paired network link ports is an access port for user device or the other network link port of the at least one pair of paired network link ports based on whether a destination address contained in the routing information of the data frame is a user device connected to the local access port or not.

The Ethernet-based multi-channels switch according to the present disclosure, wherein the routing decision component determines to discard a data frame received via one link network port of a pair of paired network link ports as a repeated data frame when judging that the data frame has been received once via the other network link port of the pair of paired network link ports based on the data sequence number contained in the data frame.

The Ethernet-based multi-channels switch according to the present disclosure, wherein the routing decision component determines to discard a data frame received via one link network port of a pair of paired network link ports as a repeated data frame when judging that the data frame has been once received by a local user device based on the data sequence number contained in the data frame.

The Ethernet-based multi-channels switch according to the present disclosure, further comprising: a receiving/transmitting decision component, configured to preferentially arrange the transmission of data frames with higher channel level and transmit data frames with next channel level after completing the transmission of the data frames with the current highest channel level.

The Ethernet-based multi-channels switch according to the present disclosure, wherein the receiving/transmitting decision component, when data frames with higher channel level than that of the data frame being transmitted is delivered via the routing decision component, approves the transmission request of the data frames with higher channel level, interrupts the transmitting of the data frame with lower channel level being transmitted, repackages the remaining data portion of the interrupted data frame according to its original header data and arranges the repackaged data frame at the first place of the data queue to be transmitted which the data frame with lower channel level being transmitted belongs to.

The Ethernet-based multi-channels switch according to the present disclosure, wherein the receiving/transmitting decision component, when determining that two or more consecutive data frames with the same channel level received via the channel arbitration component are valid interrupted data frames, reassembles the two or more valid interrupted data frames into one data frame and arranges the reassembled data frame at the end of the data queue which will enter into the routing decision component and has the channel level associated with the reassembled data frame.

The Ethernet-based multi-channels switch according to the present disclosure further comprises: a data legal verification component, configured to perform protocol check and CRC check on a received data frame to verify if the received data frame is legal.

The Ethernet-based multi-channels switch according to the present disclosure, wherein the at least one pair of paired network link ports are two pair of paired network link ports, wherein one pair of paired network link ports is assigned to the channel with the highest level channel and the other pair of paired network link ports is assigned to the channels with the remaining channel levels.

The Ethernet-based multi-channels switch according to the present disclosure, wherein the at least one pair of paired network link ports are two pair of paired network link ports, wherein one pair of paired network link ports is assigned to the channels with the first and the second higher channel levels and the other pair of paired network link ports is assigned to the channels with remaining lower channel levels.

According to another aspect of the present disclosure, a method for performing data channel arbitration in an Ethernet switch is provided. The method comprises: receiving a data frame from an access port for user device or a network link port of the Ethernet switch; parsing a source device MAC address and a destination device MAC address contained in the received data frame and a channel level to which the received data frame belongs; and determining a channel level to be occupied by the received data frame based on the higher channel level between the channel level associated with the source user device and the channel level associated with the destination device which are contained in the received data frame and sequentially arrange the received data frame in a data queue in the channel with the determined channel level.

The method for performing data channel arbitration in an Ethernet switch according to the present disclosure further comprises: determining a channel level of a broadcast or multicast data frame and a channel level of an acknowledgement data frame for the broadcast or multicast data frame as the lowest channel level.

The method for performing data channel arbitration in an Ethernet switch according to the present disclosure further comprises: directly determining a channel level of a broadcast or multicast data frame, a channel level of an acknowledgement data frame for the broadcast or multicast data frame, and a channel level of a subsequent confirmation data frame as the lowest channel level.

The method for performing data channel arbitration in an Ethernet switch according to the present disclosure further comprises: directly determining a channel level of a data frame which is received from a local user device and whose MAC address is not contained in the MAC address table of the switch as the lowest channel level; and for a channel level of a data frame which is received from a network link port and needs to be further forwarded, maintaining a forwarding channel of the data frame at the same channel level.

According to still another aspect of the present disclosure, a data communication method performed by an Ethernet switch is provided, which comprises: a receiving step of receiving a data frame transmitted by a user device connected to a local access port or a data frame forwarded from a neighbor switch via one of a pair of paired network link ports; a channel arbitration step of determining a channel level to be occupied by a data frame based on the higher channel level between the channel level of the source user device and the channel level of the destination device which are contained in the data frame and sequentially arranging the received data frame in a data queue in the channel with the determined channel level; and a routing decision step of sequentially obtaining a data frame of a data queue from each channel in order from high channel level to low channel level, judging the attribute of the data frame obtained from each level channel based on the routing information of the data frame, and determining the routing direction of the obtained data frame based on the attribute of the obtained data frame and the channel level associated with the obtained data frame and forwarding the obtained data frame.

The data communication method performed by an Ethernet switch according to the present disclosure, wherein the channel arbitration step comprises: determining a channel level of a broadcast data frame and a channel level of an acknowledgement data frame for the broadcast data frame as the lowest channel level The data communication method performed by an Ethernet switch according to the present disclosure, wherein the channel arbitration step comprises: directly determining a channel level of a broadcast data frame, a channel level of an acknowledgement data frame for the broadcast data frame, and a channel level of a subsequent confirmation data frame as the lowest channel level.

The data communication method performed by an Ethernet switch according to the present disclosure, wherein the routing decision step comprises: determining that the attribute of a data frame received from the local access port is a network link port, and bilaterally routing the data frame to a pair of paired network link ports.

The data communication method performed by an Ethernet switch according to the present disclosure, wherein the routing decision step comprises: judging that the attribute of a broadcast data frame received via one network link port of the at least one pair of paired network link ports is an access port for user device and the other network link port of the at least one pair of paired network link ports.

The data communication method performed by an Ethernet switch according to the present disclosure, wherein the routing decision step comprises: judging that the attribute of a data frame received via one network link port of the at least one pair of paired network link ports is an access port for user device or the other network link port of the at least one pair of paired network link ports based on whether a destination address contained in the routing information of the data frame is a user device connected to the local access port or not.

The data communication method performed by an Ethernet switch according to the present disclosure, wherein the routing decision step comprises: determining to discard a data frame received via one link network port of a pair of paired network link ports as a repeated data frame when judging that the data frame has been received once via the other network link port of the pair of paired network link ports based on the data sequence number contained in the data frame.

The data communication method performed by an Ethernet switch according to the present disclosure, wherein the routing decision step further comprises: determining to discard a data frame received via one link network port of a pair of paired network link ports as a repeated data frame when judging that the data frame has been received once by a local user device based on the data sequence number contained in the data frame.

The data communication method performed by an Ethernet switch according to the present disclosure further comprises: a receiving and transmitting decision step of preferentially arranging the transmission of data frames with higher channel level and transmitting data frames with next channel level after completing the transmission of the data frames with the current highest channel level.

The data communication method performed by an Ethernet switch according to the present disclosure, wherein the receiving and transmitting decision step further comprises: after data frames with higher channel level than that of the data frame being transmitted is decided in the routing decision step, approving the transmission request of the data frames with higher channel level, interrupting the transmitting of the data frame with lower channel level being transmitted, repackaging the remaining data portion of the interrupted data frame according to its original header data and arranging the repackaged data frame at the first place of the data queue to be transmitted which the data frame with lower channel level being transmitted belongs to.

The data communication method performed by an Ethernet switch according to the present disclosure, wherein the receiving and transmitting decision step further comprises: when determining that two or more consecutive data frames with the same channel level received via the channel arbitration component are valid interrupted data frames, reassembling the two or more valid interrupted data frames into one data frame and arranging the reassembled data frame at the end of the data queue which will be decided in the routing decision step and has the channel level associated with the reassembled data frame.

The data communication method performed by an Ethernet switch according to the present disclosure further comprises: a data legal verification step of performing protocol check and CRC check on a received data frame to verify if the received data frame is legal.

BRIEF DESCRIPTION OF THE DRAWINGS

The accompanying drawings attached hereto will be incorporated into the present description as a part thereof, shows some embodiments in conformity with the present disclosure, and is used to explain the principle of the present disclosure together with the description.

DETAIL DESCRIPTION OF THE EMBODIMENTS

Herein, exemplary embodiments will be described in detail and examples are illustrated in the accompanying drawings. When the description below refers to the accompanying drawings, the same numeral in the different figures represents the same or similar elements unless otherwise indicated. The embodiments described in the following exemplary embodiments do not represent all embodiments of the present disclosure. Instead, they are merely examples of devices and methods consistent with aspects of the present disclosure as detailed in the appended claims.

The terminology used in the present disclosure is for the purpose of describing particular embodiments only and is not intended to limit the present disclosure. The singular forms "a", "said" and "the" mentioned in the appended claims and the present description is to indicate the plural forms, unless the context clearly indicates something else. It should also be understood that the term "and/or" as used herein refers to and comprises any and all possible combinations of one or more of the associated listed items.

It should be understood that, although the terms "first", "second", "third", etc. may be used to describe various information in this disclosure, such information should not be limited to these terms. These terms are only used to distinguish the same type of information from each other. For example, without departing from the scope of the present disclosure, the first device may also be referred to as a second device. Similarly, the second device may also be referred to as a first device. Depending on the context, the word "if" as used herein can be interpreted as "in . . . ", "when . . . " or "in response to the determination of . . . ".

In order to make those skilled in the art understand the present disclosure better, the present disclosure will be further described in detail below with reference to the drawings and specific embodiments.

Figure 1:
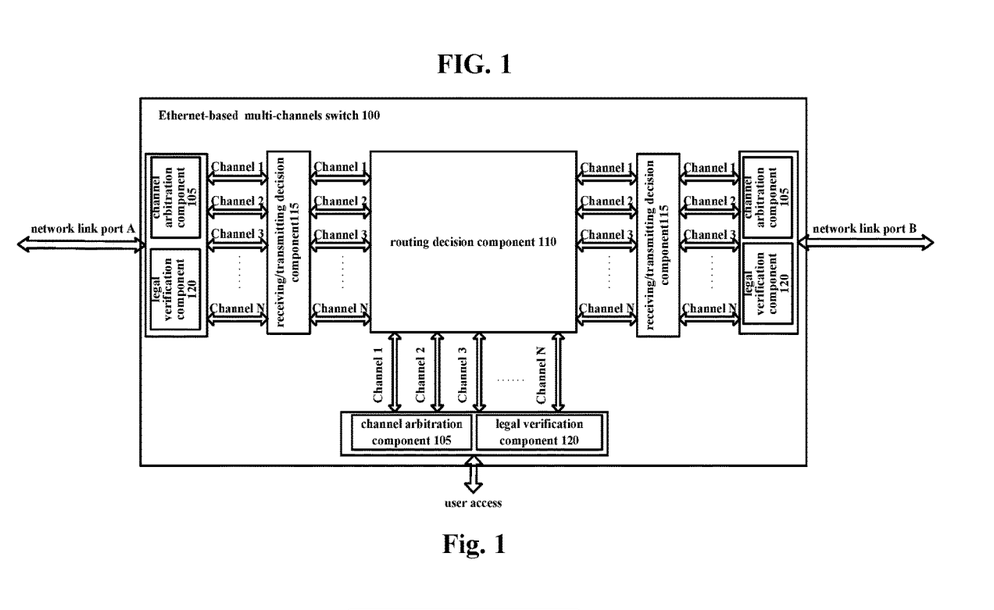
FIG. 1 is a schematic diagram showing the principle of An Ethernet-based multi-channels switch in accordance with a first embodiment of the present invention.

FIG. 1 is a schematic diagram showing the principle of An Ethernet-based multi-channels switch in accordance with a first embodiment of the present invention. As shown in FIG. 1, the Multi-channels switch 100 over Ethernet includes: one or more access ports for user device, at least one pair of paired network link ports A and B, a channel arbitration component 105, and a routing decision component 110. Although a plurality of channel arbitration components 105 are shown in FIG. 1 for ease of illustration, only one channel arbitration component 105 can be actually used in the switch. Alternatively, however, each port can have a corresponding channel arbitration component 105 to achieve the objectives of the present invention.

As shown in FIG. 1, the "user access" is an access port for a user device. For the sake of simplicity, only one access port for the user device is displayed, but a plurality of access ports for the user device can be provided so that a plurality of user devices can be connected thereto. Inside the switch 100, a plurality of channels of different levels are provided, such as channel 1, channel 2, . . . Channel N. The channel arbitration component 105 and the routing decision component 110 are directly or indirectly connected to each other via these channels of different levels. The channel arbitration component 105 receives a data frame transmitted from the user device via the access port or forwarded via the network link port A or B, determines a channel level to be occupied by the received data frame based on the higher channel level between the channel level associated with the MAC address of the source user device and the channel level associated with the MAC address of the destination device which are contained in the received data frame, and sequentially arrange the received data frame in a data queue in the channel with the determined channel level. The routing decision component 110 sequentially obtains a data frame of a data queue from each channel in order from high channel level to low channel level, judges the attribute of the data frame obtained from each level channel based on the routing information of the data frame, and determines the routing direction of the obtained data frame based on the attribute of the obtained data frame and the channel level associated with the obtained data frame. For example, if the data frame is from a local access port for user device, the routing decision component 110 decides that the attribute of the data frame is the network link ports A and B, and thereby duplicates the data frame and bilaterally routes the data frame and its duplication to a pair of paired network link ports. If the data frame is from a network link port A or B, then the routing decision component 110 determines whether it is downloaded locally without continuing to forward it or only to forward it to the next switch based on its destination MAC address and whether it is received repeatedly. In another situation, if the data frame is recognized as a broadcast data frame, the routing decision component 110 duplicates the broadcast data frame and forward one of the broadcast data frame and its duplication to a access port for user device and the other to a next switch. The data communication process of the switch will be described in detail below.

Figure 2:
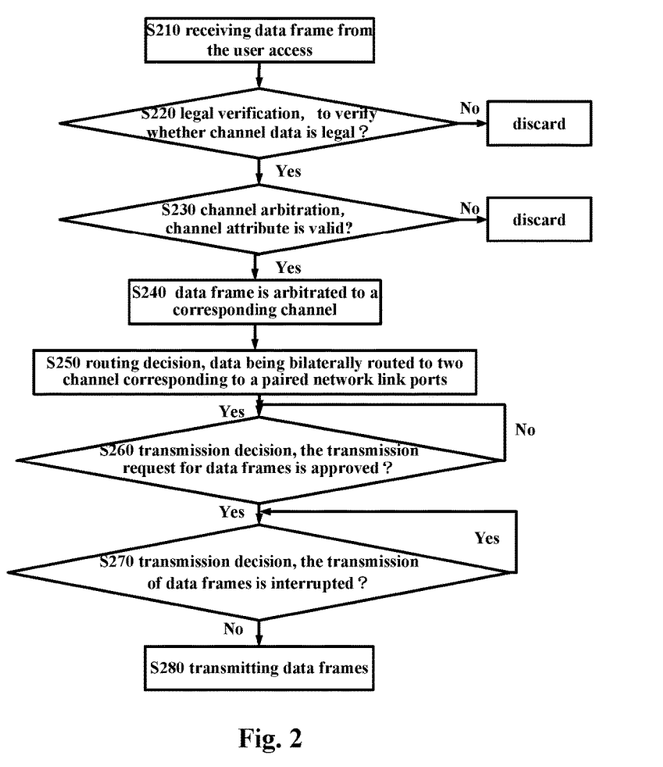
FIG. 2 is a flow chart showing the processing of the Ethernet-based multi-channels switch in accordance with the present disclosure when receiving data from the user device.

FIG. 2 is a flow chart showing the processing of the multi-channels switch 100 over Ethernet in accordance with the present disclosure when receiving data from the user device. As shown in FIG. 2, at step S210, a data frame transmitted from the user device is received via a user access port. Each data frame usually has a data structure as shown in Table 1:

TABLE 1

| TARGET mac | SOURCE mac | Channel attribute, State of TARGET mac | Channel attribute, State of SOURCE mac | Other route information | Data | CRC |

The data frame transmitted by the user device usually contains a MAC address of a destination device which is the "TARGET mac" shown in Table 1, and a MAC address of a source device, which is a MAC address of the user device transmitting the data frame which the "source device MAC address", i.e. the "SOURCE mac" as shown in Table 1. In the meantime, in order to facilitate section of a suitable channel for the data frame between the channel level associated with a source and the channel level associated with destination of the data frame, a field indicating a channel attribute associated with a destination user device and a field indicating a channel attribute associated with a source device is added in the header of the data frame. According to the requirement of the present disclosure, in order to achieve the data communication performed by the multi-channels switch 100 over Ethernet in accordance with the present disclosure, each legal user device can be pre-assigned to a channel level and those user devices which are not assigned to a channel level will be determined as the device with the lowest channel level by default For each data frame from a user device, a data legal verification is performed at step S220 to verify whether the channel data is legal. Returning to FIG. 1, as shown in FIG. 1, the switch 100 also includes a legal verification component 120. The legal verification component 120 firstly performs legal verification on the received data frame, that is, mainly performs protocol verification and CRC verification on the received data frame. Those data frames in which the legal verification is not successful will be determined as illegal channel data and the illegal channel data will be discarded. If the data frame is verified legal, at step S230, the channel arbitration component 105 performs channel attribute arbitration on the data frame. If the data frame does not contain any channel attributes or the channel attribute data of the data frame does not match with the channel attribute data assigned by the switch 100, the data frame will be is discarded directly. If the data frame contains a channel attribute, at step S240, the channel arbitration component 105 will determine the channel level associated with the data frame based on the channel attributes in the data frame shown in Table 1. Specifically, the channel arbitration component 105 determines the channel level to be occupied by the received data frame based on the higher channel level between the channel level associated with the source MAC channel attribute and the channel level associated with the target MAC channel attribute in Table 1, and sequentially arranges the received data frame in a data queue in the channel with the determined channel level data frame. If the data frame transmitted from the local user device is a broadcast or multicast data frame, the channel arbitration component 105 directly arbitrates the data frame to the lowest channel level at step S240. The data frame in conformity with the data protocol of the present disclosure includes an attribute which indicates whether the data frame is a unicast data frame, a broadcast data frame, or a multicast data frame, and the indication manner belongs to the conventional technical means in the field of the present disclosure and will not be omitted.

Next, at step S250, for data queues from local user devices and arranged in channels of each different channel level, the routing decision component 110 preferentially performs routing decision processing on the data in the queue data in the highest-level channel. Specifically, the routing decision component 110 duplicates the data frame from the local user device, adds the device channel attribute information, status, and other routing information to the data frame so as to be repackaged, and then simultaneously routes the identical data frames to two network link ports A and B respectively so that a bilateral forwarding can be achieved.

After the decision of the routing decision component 110, the data can be subsequently forwarded in accordance with the channel priority level associated with the data. Alternatively, the data passing through the routing decision component 110 may be sent into corresponding channel connected to the network link port based on the respective channel levels associated with the data, and at step S260, the transmission decision process is performed. Referring back to FIG. 1, the switch 100 can also include a receiving/transmitting decision component 115. Although there are a plurality of receiving/transmitting decision components 115, shown in FIG. 1, for convenience of illustration, only one receiving/transmitting decision component 115, are shown. Of course, one receiving/transmitting decision component 115 can also be provided for each network link port. Specifically, the receiving/transmitting decision component 115 firstly receives a transmission request for data from the respective level channel. The higher the level of the channel outputting the data is, the more preferentially the transmission request is approved. Therefore, at step S260, for data queues that are arranged in channels with different channel levels, the transmission request for data frames of the data queue in a high-level channel is preferentially acquired and approved. After the transmission request of the data frame of the current highest channel level (not necessarily the highest channel level of all channel levels) is approved, at step S270, it is judged whether or not a data frame is being transmitted to the network link port A or B. If so, it is determined whether the channel level associated with the data frame being transmitted is lower than the current highest channel level associated with the data frame being approved to be transmitted. If the result of the determination is "No", the data frame or more with the current highest channel level will return to wait until the transmitting of all data frame being transmitted with channel level no lower than the current highest channel level is completed. If the result of the determination is "Yes", that means that the channel level associated with the data frame being transmitted which is occupying the network link port A or B connecting two adjacent switches is lower than the current highest channel level of the data frame being approved to be transmitted, Thus, the receiving/transmitting decision component 115 makes a transmission decision to interrupt the transmission of the low-level channel data frame being transmitted, and immediately proceeds to step S280 to transmit the data frame with the current highest channel level being approved to be transmitted. After interrupting the transmission of the low-level channel data frame being transmitted, the receiving/transmitting decision component 115 repackages the remaining data portion of the interrupted data frame which is not transmitted based on its original frame header data and arranges the repackaged data frame at the first place of its original channel with its original channel level, so as to wait for the next iteration of the processing of steps S260-S270.

Referring back to FIG. 1, although FIG. 1 shows that the receiving/transmitting decision component 115 is disposed between the routing decision component 110 and the channel arbitration component 105, no channel arbitration will be performed again on any data frame to be forwarded to a next switch via the network link port since the data frame has been subjected to the channel arbitration after the data frame is received by the switch and before being subjected to the routing decision, and the data frame will be forwarded to the network link port A or B directly or via the receiving/transmitting decision component 115 so as to arrive at a neighbor switch.

Figure 3A:
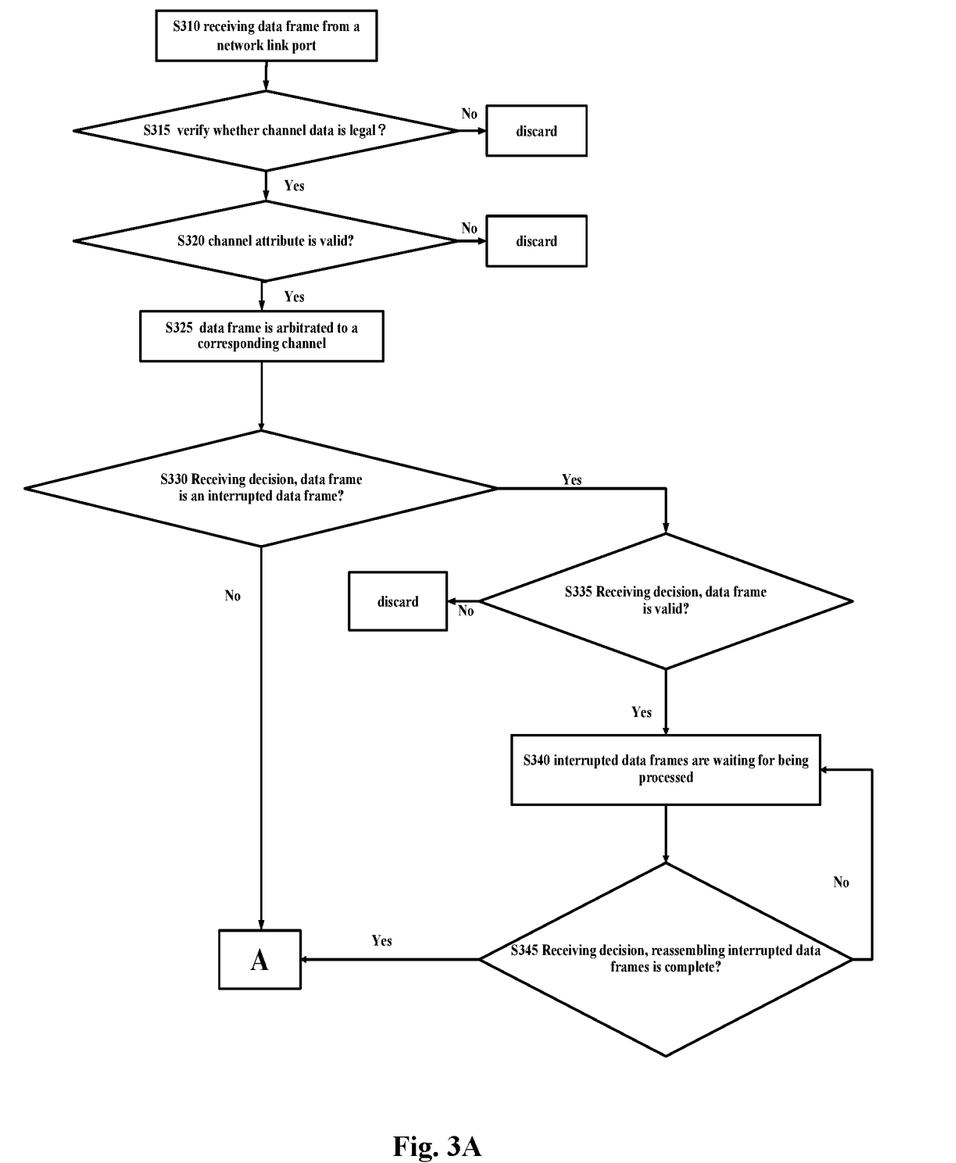
FIG. 3A and FIG. 3B are flow charts showing the processing the present Ethernet-based multi-channels switch in accordance with the present disclosure when receiving data from a network link port.
Figure 3B:
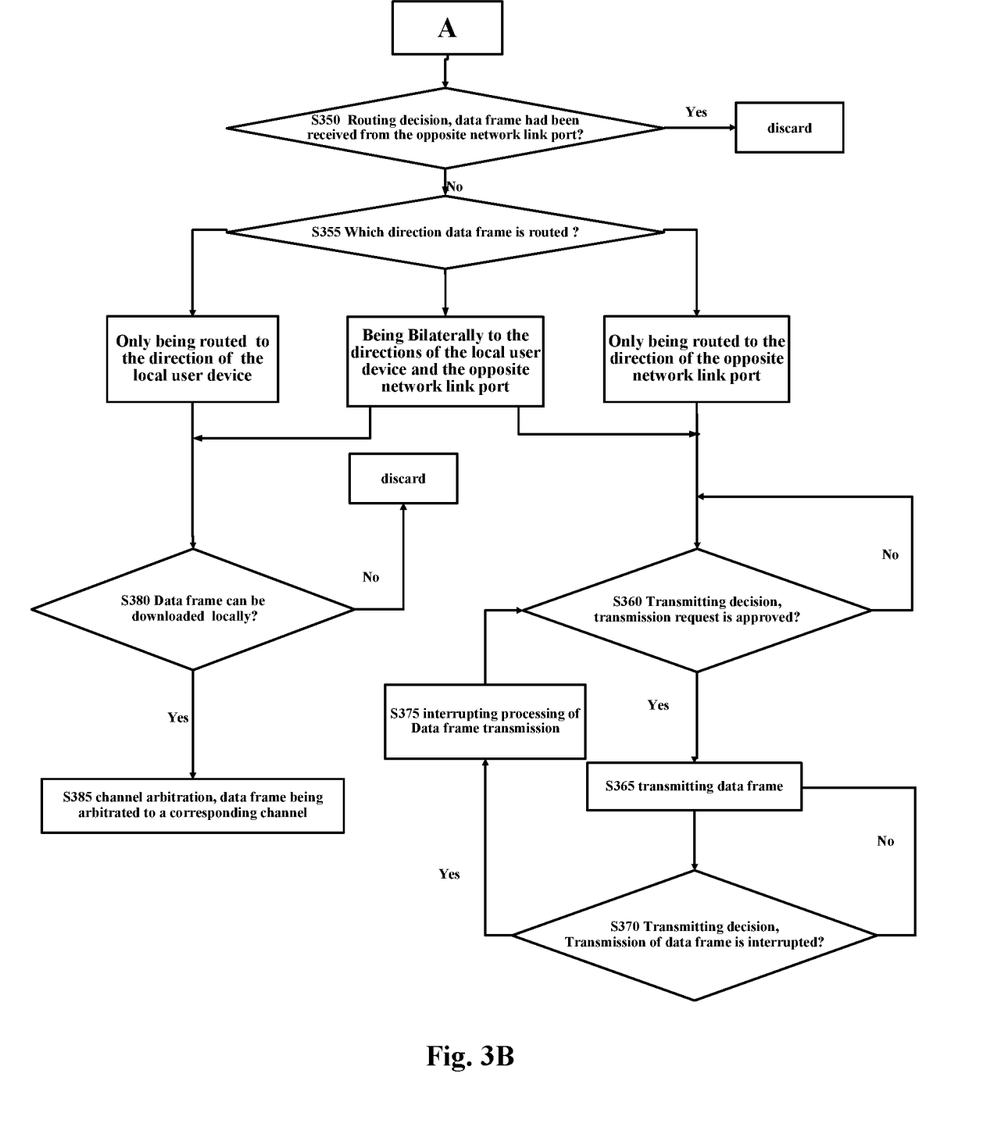

In addition, the switch 100 also receives data frames forwarded by another switch 100 via the network link port A or B. FIG. 3A and FIG. 3B are flow charts show the processing of the present multi-channels switch 100 over the Ethernet in accordance with the present disclosure when receiving data from a network link port. As shown in FIG. 3, for example, a data frame is received via the network link port A. At step S10, the data frame forwarded by a switch 100 on the left of the FIG. 1 (not shown) arrives at the network link port A and enters the local switch 100. Subsequently, at step S315, the legal verification component 115 of the local switch 100 performs legal verification on the received data to verify whether the channel data is legal. Specifically, the legal verification component 120 firstly performs legal verification on the received data frame, and mainly performs protocol verification and CRC verification. Data for which the verification is not successful is called illegal channel data which will be discarded. If the data frame is legal, at step S320, the channel arbitration component 105 performs channel attribute arbitration on the legal data frame. If the data frame does not contain any channel attributes or the channel attribute data of the data frame does not match with the channel attribute data assigned by the switch, the data frame will be is discarded directly. If the data frame contains a channel attribute, at step S325, the channel arbitration component 105 will determine the channel level associated with the data frame based on the channel attributes in the data frame shown in Table 1. Specifically, the channel arbitration component 105 determines the channel level to be occupied by the received data frame based on the higher channel level between the channel level associated with the source MAC channel attribute and the channel level associated with the target MAC channel attribute in Table 1, and sequentially arranges the received data frame in a data queue in the channel with the determined channel level of the data frame. When the channel arbitration component 105 acquires that the data frame from a neighbor switch contains the determined channel level attribute and the data frame is to be forwarded, the data frame is directly arbitrated to the channel of the level corresponding to the channel attribute carried by the data frame itself. If the data frame forwarded by the neighbor switch 100 on the left of the FIG. 1 (not shown) is a broadcast or multicast data frame, the channel arbitration component 105 directly arbitrates the channel level of the broadcast or multicast data frame to the lowest channel level at step S325

Next, at step S330, the receiving/transmitting decision component 115 makes a receiving decision for the data frames of respective channel levels. Firstly, the receiving/transmitting decision component 115 determines whether the data frames successively received in a channel are interrupted data frames. If the successively received data frames are interrupted data frames, at step S335, the receiving/transmitting decision component 115 determines whether the successively received interrupted data frames are valid data frames. If there is a CRC check failure after the successively received interrupted data frames are reassembled, the successively received interrupted data frames lack one or more frames or portions (i.e. the reassembled data frame is incomplete), or another data frame with different header is inserted between two interrupted data frames belonging to the same original data frame, the receiving/transmitting decision component 115 determines that the received interrupted data frames are invalid data frames. The invalid interrupted data frame is discarded. If the interrupted data frame is a valid data frame, at step S340, the interrupted data frame is buffered in a receiving buffer of the corresponding channel level to wait for another interrupted data frame formed by the remaining portion of the data frame being interrupted. If the interruption on a data frame ends and all the remaining interrupted data frame(s) is transmitted and received in the receiving buffer of the corresponding channel level, all the interrupted data frames are reassembled at step S345 and the receiving/transmitting decision component 115 determines whether the reassembled data frame is complete or not. If the reassembled data frame is incomplete, the process will return and repeat steps S335-345. If the reassembled data frame is complete, the complete reassembled data frame is arranged at the end of the data queue which is in a channel with corresponding channel level and will be sent to the routing decision component 110, and waits to be sent to the routing decision component 110. On the other hand, the receiving/transmitting decision component 115 approves the receiving requests of the data in the current highest level channel (not necessarily the highest level channel in all level channels, but only the highest level channel of those level channels in which a data queue is) one by one, and outputs the approved data frames the routing decision component 110 one by one via their the channel of corresponding current highest level.

FIG. 3B is a continuation of FIG. 3A and joins to FIG. 3A via a node labeled "A" so as to form an overall flow chart. As shown in FIG. 3B, at step S350, when the routing decision component 110 sequentially obtains the data frames forwarded from a previous neighbor switch according to the channel levels associated with the data frame, the routing decision component 110 firstly determines whether a data frame identical to the data frame has been received once via another network link port, such as the network link port B, based on the data receiving history information held by the switch. If the result is "Yes", the data frame will be discarded and no specific routing decision is made. If the result is "NO", at step S355, based on the MAC address or routing information of the data frame, the routing decision component 110 determines that the destination of the data frame is a local user device so that the data frame will be only routed to the local access port, that the data frame will be only forwarded to the opposite network link port of a pair of paired network link ports, or that the data frame will be bilaterally forwarded. When the received data frame is a broadcast or multicast data frame, routing decision component 110 determines that the data frame will be bilaterally forwarded. In addition, if the data frame is a unicast data frame, but in case there is a device in the network having a MAC address with the same MAC address as the local user device, the data frame is also determined to be forwarded bilaterally. Bidirectional routing for a data frame from a network link port indicates that the data frame will be downloaded locally and further forwarded via an opposite network link port. When the destination MAC of the unicast data frame does not exist in the MAC address table of the local switch, the unicast data frame will only be route to an opposite network link port, such as the network link port B. When the destination MAC of a unicast data frame exists in the MAC address table of the local switch and no device in the network has a MAC address with the same MAC address as the local user device, the unicast data frame will be route to an access port of the local user device.

As shown in FIG. 3B, if a data frame is routed to an opposite network link port, the receiving/transmitting decision component 115 performs a transmission decision process. At step S360, the receiving/transmitting decision component 115 firstly receives a transmission request for receiving a data frame to be transmitted according to the levels of channels. If the transmission request is approved, the data frame is directly forwarded at step S365. Although another receiving/transmitting decision component 115 is shown on the right side of the schematic diagram of FIG. 1 and disposed between the routing decision component 110 and the channel arbitration component 105, this does not mean that the data frame to be forwarded needs to be subjected to channel arbitration and legal verification again. Therefore, showing another receiving/transmitting decision component 115 on the right side of the schematic diagram of FIG. 1 is only to schematically illustrate that a data frame from the network link port B will also be subjected to the channel arbitration and the legal verification. In fact, the same label in FIG. 1 indicates the same components or units. Of course, these components can also be provided separately.

When a low channel level data frame is being transmitted, if the data frame to be transmitted is received in a channel of higher channel level than that of the data frame being transmitted, the receiving/transmitting decision component 115 will approve the transmission request associated with the higher channel level data frame immediately at step S360, and transmit the higher channel level data frame at the same time at step S365 and issue an interruption command to interrupt the transmission of the low channel level data frame being transmitted at step S370. Subsequently, the receiving/transmitting decision component 115 performs an interrupt processing on the remaining portion to be transmitted of the low channel level data frame at step S375. For example, the interrupt processing includes repackaging the remaining data portion of the interrupted data frame according to its original header data, arranging the repackaged data frame at the first place of the data queue to be transmitted which the data frame with lower channel level being transmitted belongs to, and waiting for the next process of steps S360-S375 to be re-executed.

As shown in FIG. 3B, if the data frame is decided to be routed to an access port connected to local device user, the routing decision component 110 determines whether the data frame is downloaded locally at step S380. If it is determined that the data frame cannot be downloaded locally, the data frame will be discarded. If it is determined that the data frame can be downloaded locally, channel arbitration on the data frame is performed at step S385 so that the data frame be downloaded locally are arranged into channels of the corresponding level so that the data frames are received by the corresponding user device.

Figure 4:
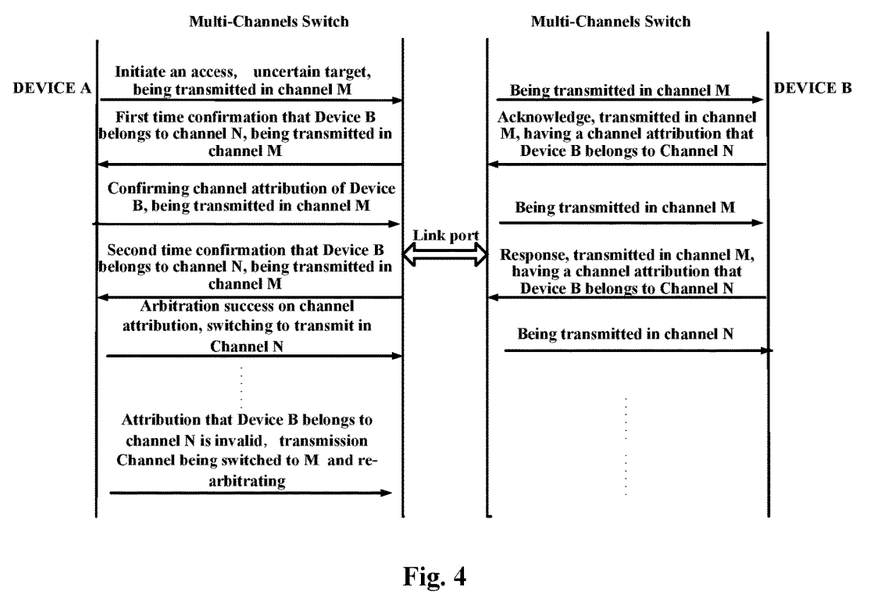
FIG. 4 is a timing diagram of channel arbitration performed by the channel arbitration component 105 of the Ethernet-based multi-channels switch in accordance with the present invention.

For additional security purposes, the switch of this disclosure shall take the special measure to deal with possible attacking data frames, which has been mentioned in a word of the above description. In order to clarify this process, the channel arbitration process on the broadcast data frame performed by the channel arbitration component 105 will be described in detail in conjunction with FIG. 4. FIG. 4 is a timing diagram of channel arbitration performed by the channel arbitration component 105 of the Ethernet-based multi-channels switch in accordance with the present disclosure. As shown in FIG. 4, provided that channel M has the lowest transmission priority, such as the lowest channel level, and channel N has a high transmission priority, user device A is associated with channel M and user device B is associated with to channel N. When user device A initiates a broadcast or multicast access via the user access port of the switch, a broadcast or multicast data frame is transmitted by user device A. The broadcast data frame contains the MAC address of user device A and does not contain the MAC address of destination user device B. Although it is assumed that the channel level corresponding to the MAC address of user device A may be a higher level, the channel arbitration component 105 still arbitrates the broadcast data frame in the lowest level channel, such as the M channel. That is, a data frame whose destination MAC address is uncertain shall be arbitrated as a data frame with the lowest channel level. That is, any data frame whose destination MAC address is uncertain or whose destination MAC address does not exist in the MAC address table of the local switch shall be arbitrated as a data frame with the lowest channel level by default. With the transmission of the data frame from the user device A, the switch associated with the user device A can acquire the MAC address of the user device A as a source MAC address and store it in the MAC address table of the switch. Subsequently, if the destination user device B connects to a user access port of another switch 100, after the broadcast data frame arrives at the switch 100 to which the user device B is connected, the user device B can initiate an acknowledgement data frame and the channel arbitration component 105 will arbitrate the acknowledgement data frame in the lowest level channel, such as the M channel, although the channel attribute of the user device B may be assigned to as a higher level, such as N channel. As user device B responds to the broadcast or multicast data frame, the switch 100 to which user device B belongs will acquire the MAC address of the user device B as the source user device and store it in the address table. Similarly, the channel arbitration component 105 of the switch to which user device A belongs also determines that the acknowledgement data frame is returned to the user device A via the lowest level channel M. After a round-trip communication between the user device A and the user device B, both switches 100 according to the present disclosure to which the user device A and the user device B respectively belong acquire the MAC address, channel attribute, device validity, authentication status and legality of each of the user device A and the each user device B. In this way, after acquiring the MAC address, channel attribute, device time validity, authentication status and legality of two user devices by the round-trip communication between the two user devices, a normal communication status between the two user devices is activated so that a regular channel arbitration and routing decision can be made in a subsequent communication therebetween.

Table 2 shows an example that the switch according to the present disclosure acquires a MAC address learning table.

TABLE 2

| Mac 1 | Channel attribute | Validity | Authentication status | Legality |
|---|---|---|---|---|
| Mac 2 | Channel attribute | Validity | Authentication status | Legality |
| . | . | . | . | . |
| . | . | . | . | . |
| . | . | . | . | . |
| Mac N | Channel attribute | Validity | Authentication status | Legality |

In Table 2, the channel attribute indicates which level channel the user device Mac is configured to, the validity indicates the channel attribute status of the device Mac, whether in activation status or worn out status, the authentication status indicates whether the channel attribute of the device Mac has passed the authentication, and the legality indicates whether the configuration of the device Mac is legal, that is, whether the device Mac has been given a right to access other channel level devices.

The process of establishing the MAC address learning table can be described as the following.

Provided that the user device A and the user device B connect respectively to a switch 1 and a switch 2 and their Mac addresses are Mac 1 and Mac 2 respectively. The user device A is associated with channel M and the user device B is associated with channel N. Channel M has the lowest transmission priority and channel N has high transmission priority. Confirming the channel attribute of the use device once represents the arbitration success. The following process describes the switching mode of the transmission channel. The specific learning process is as follows:

1. In the initial stage, Mac 1 and Mac 2 are respectively configured to be associated with channel M and channel N, and both have legality.

The Mac address learning table of switch 1 at this stage:

TABLE 3

| Mac 1 | Associated with Channel M | Inactivated | Unauthenticated | Legal |
|---|---|---|---|---|

The Mac address learning table of switch 2 at this stage:

TABLE 4

| Mac 2 | Associated with Channel N | Inactivated | Unauthenticated | Legal |
|---|---|---|---|---|

2. User device A initiates a broadcast or multicast access and queries the Mac address learning table of switch 1. The query result shows that the destination is unknown and the source Mac 1 channel status is not activated and not authenticated. Therefore, the broadcast or multicast data frame will be transmitted in the lowest priority channel M, and the Mac address learning table of switch 1 is updated as follows:

TABLE 5

| Mac 1 | Associated with Channel M | Activated | Authenticated | Legal |
|---|---|---|---|---|

3. User device B receives the broadcast or multicast data frame via switch 2 from user device A, and the Mac address learning table of switch 2 acquires Mac 1 from the broadcast or multicast data frame so that the Mac address learning table of switch 2 is updated as follows:

TABLE 6

| Mac 2 | Associated with Channel N | Inactivated | Unauthenticated | Legal |
| Mac 1 | Associated with Channel M | Activated | Authenticated | Legal |

4. The user device B acknowledges the broadcast or multicast data frame, queries the Mac address learning table of switch 2. The query result shows that the source Mac 2 channel status is not activated and not authenticated. Therefore, the acknowledgement data frame for the broadcast or multicast data frame will be transmitted in the lowest priority channel M, and the Mac address learning table of switch 2 is updated as follows:

TABLE 7

| Mac 2 | Associated with Channel N | Activated | Authenticated | Legal |
| Mac 1 | Associated with Channel M | Activated | Authenticated | Legal |

5. The user device A receives the acknowledgement data frame from the user device B, the Mac address learning table of switch 1 acquires Mac2 of the user device B contained in the acknowledgement data frame, and the Mac address learning table of switch 1 is updated as follows:

TABLE 8

| Mac 1 | Associated with Channel M | Activated | Authenticated | Legal |
| Mac 2 | Associated with Channel N | Activated | Authenticated | Legal |

The channel arbitration component 105 of the multi-channels switch 100 can arbitrate whether the current data frame belongs to the current channel or whether the current data frame needs to be switched to the corresponding channel by querying the channel attribute, the validity, the authentication status and the legality of the corresponding device Mac address in the Mac address learning table. If no channel attribute and legality is configured for a Mac address, the Mac address will be arbitrated to the lowest priority channel and does not have the right to access devices associated with other channel level. When two user devices having different channel level need to communicate with each other, the communication therebetween can be switched to the higher level channel only when the channel status associated with the high-priority channel device has been authenticated and the low-priority channel device has right to access to the high-priority channel device. Therefore, for security purposes, the switch will perform at least one confirmation on the communication channel between the user device A and the user device B with respect to the broadcast or multicast data frame. Thereafter, the channel level associated with the communication between the user device A and the user device B will be determined based on the higher channel level between the channel level associated with the user device A and the channel level associated with the user device B, for example, based on the channel N level. This can ensure the security of network.

Further, as shown in FIG. 4, to improve the security of network communication, a second confirmation on the communication channel level between the user device A and the user device B can be provided. That is, after the user device A sends the user device B a second data frame as a confirmation signal, the channel arbitration component 105 will still arbitrate the channel level of the confirmation signal to be the lowest channel level based on the ID of the second data frame between the two user devices (for example, the serial number of the data frame being communicated between the two user devices), although the MAC addresses of the user device A and the device B are already contained in the data frame and the MAC address learning tables of the two switches have also learned their respective attribute information. When the user device B responds to the confirmation signal, the channel arbitration component 105 of the switch connected to the user device B determines the channel level of the acknowledgement data frame for the confirmation signal based on the ID of the acknowledgement data frame between the two user devices. After the correct secondary confirmation, the channel level associated with all the communications between the user device A and the user device B will be determined by the channel arbitration component 105 based on the higher channel level between the channel level associated with the user device A and the channel level associated with the user device B, and always be maintained at the same channel level unless the user device A and the user device B do not communicate with each other for a long time since their validities have changed, such as being worn out or being inactive. Therefore, as shown in FIG. 4, when the channel attribute of user device B changes, the channel arbitration component 105 will acquire this changing and re-arbitrate the channel level of the communication between the user device A and the user device B based on this change. With such one confirmation or two confirmations, it is possible to block possible attack access from occupying the higher level channel.

In the subsequent communication, for the data frame from the user device A to the user device B, when querying the MAC address learning table to verify the channel status associated with Mac 1 and Mac 2 to be valid, the channel arbitration component 105 arbitrates the communication of the data frame from the user device A to the user device B to channel N. At the same time the MAC address learning table is updated based on the data frame. When no data frame associated with a Mac address is not received for a long time or a set period, the channel validity associated with the Mac address will change from active to worn out and the authentication status associated with the Mac address will change to an unauthenticated status. If a communication is involved in the Mac address, an authentication on the Mac address shall be performed again.

In summary, when the channel arbitration succeeds, the two user devices communicate on channel N, and when the channel attribute of one of the two user devices is invalid, communication between the two user devices will re-arbitrated to channel M. Therefore, in order to ensure the legality of the channel transmission, two confirmations on the channel attribute are used to indicate the arbitration success.

Figure 5:
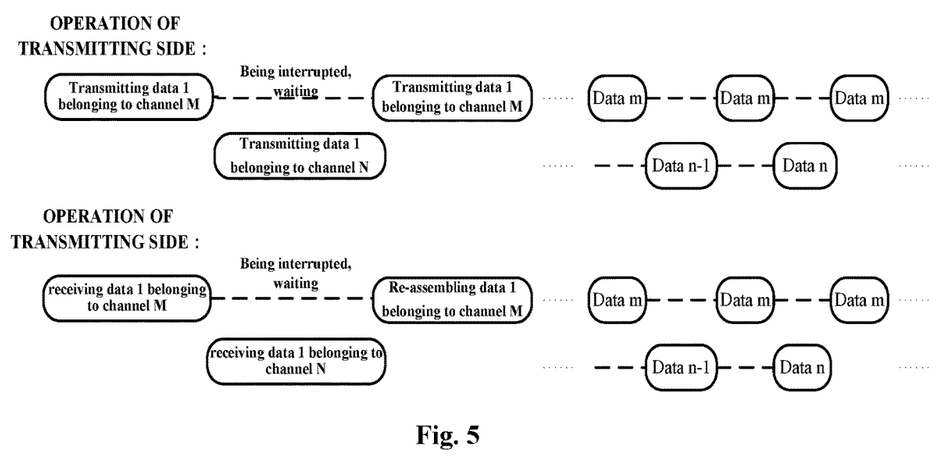
FIG. 5 is a schematic diagram showing the interrupt processing performed by the receiving/transmitting decision component of the switch in accordance with the present disclosure.

As described above, with respect to the data frames of different channel levels, the receiving/transmitting decision component 115 of the switch 100 according to the present disclosure can preferentially transmit or receive the data frame associated with higher channel level by interrupting the transmission of the data frame associated with lower channel level, so that those data frame requiring a higher time efficiency can achieve an "overtaking" effect. FIG. 5 it is provided a schematic diagram showing the interrupt processing performed by the receiving/transmitting decision component 115 of the switch in accordance with the present disclosure. As shown in FIG. 5, Provided that the transmission priority of channel M and channel N is channel N>channel M. Data 1 to data m associated with channel level M from the user device A are being transmitted via channel M. At the same time, Data 1 to data n associated with channel level N from the user device B associated with a higher channel attribute, such as N level, arrives at the same switch. At this time, the receiving/transmitting decision component 115 of the switch interrupts the transmission of the data 1 to data m based on the fact that the channel level N of the channel attribute of the user device B is higher than the channel level M, repackages the remaining data portion to be transmitted based on the routing information of the interrupted data frame, and arranges the repackaged data frame at the first place of the data queue of channel level M to be transmitted, which means that, in the same level channel, the remaining data portion of the interrupted data frame has the right to be preferentially transmitted. In this way, Data 1 to data n associated with channel level N can occupy the transmission channel for data transmission. At the same time, in one data frame of data 1 to data m, the data portion that has been forwarded to the next switch will be buffered in order to wait for a repackaged data frame to arrive in, which contains the remaining data portion which has not be transmitted yet, and after all the data portions whose transmissions have been interrupted are received two or more data portions are reassembled a data frame so as to be forwarded further or downloaded locally.

Figure 6:
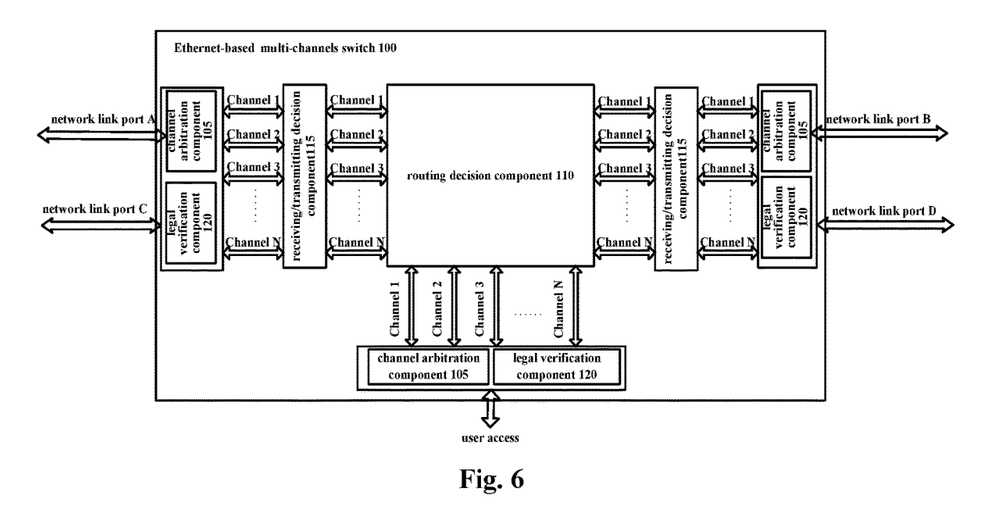
FIG. 6 is a schematic diagram showing the principle of a multi-channels switch 100 over Ethernet in accordance with a second embodiment of the present disclosure.

FIG. 6 is a schematic diagram showing the principle of a multi-channels switch 100 over Ethernet in accordance with a second embodiment of the present disclosure. As shown in FIG. 6, the second embodiment differs from the first embodiment in that the physical network link ports of the switch are two pairs, including the first pair of paired network link ports A and B and the second pair of paired network link ports C and D. According to the user's purpose, the first pair of paired network link ports A and B are assigned for a data frame of high channel level, such as data frame associated with channel levels 3 and 4, and the second pair of paired network link ports C and D are assigned for data frame of other channel levels, such as data frame associated with channel levels 1 and 2. However, in the same pair of paired network link ports, transmission of data frames of different channel levels still follows the principle that the data frame of a higher channel level will be transmitted preferentially. For example, in the second pair of paired network link ports C and D, if a data frame of channel level 2 arrives when a data frame of channel level 1 is being transmitted, the receiving/transmitting decision component 115 will interrupt the transmission of data frame of channel level 1 and allow the data frame of channel level 2 to occupy the second pair of paired network link ports C and D to be forwarded. Similarly, in the first pair of paired network link ports A and B, if a data frame of channel level 4 arrives when a data frame of channel level 3 is being transmitted, the receiving/transmitting decision component 115 will interrupt the transmission of the data frame of channel level 3 and allow the data frame of channel level 24 to occupy the first pair of paired network link ports A and B to be forwarded. Further, the same portions as those of the first embodiment will be omitted.

Figure 7:
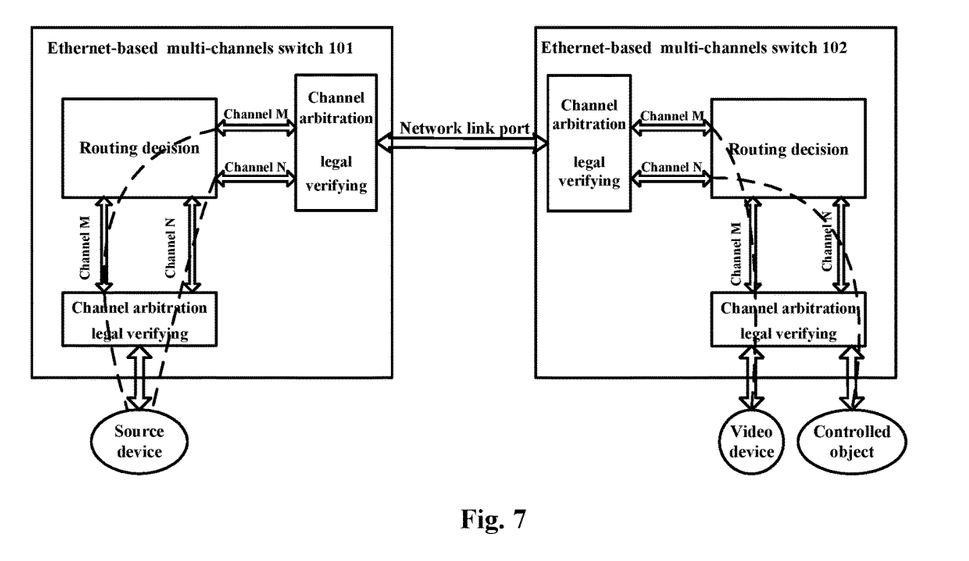
FIG. 7 is a diagram of a network embodying the multi-channels switch 100 over Ethernet in accordance with the present invention.

FIG. 7 is a diagram of a network embodying the multi-channels switch 100 over Ethernet in accordance with the present disclosure. As shown in FIG. 7, one user access port of the switch 101 is connected to the source device, and the user access ports of the other switch 102 are connected to the video device and the controlled object. As shown in FIG. 7, the user assigns channel N to the channel attribute of the controlled object and assigns channel M to the channel attribute of the video user device, and channel N has the highest transmission priority. When the source device issues a broadcast data frame to access the video device, and after the channel arbitration component performs one confirmation or two confirmations on the lowest channel level, a communication link between the source user device and the video device having the channel attribute of channel level M is established. Similarly, when the source device issues a broadcast data frame to access the controlled object, and after the channel arbitration component performs one confirmation or two confirmations on the lowest channel level, a communication link between the source user device and the controlled object having the channel attribute of channel level N is established. If the switch needs to transmit data frame of channel level N between the source user device and the controlled object when data frame of channel level M is being transmitted between the source user device and the video device via a pair of paired network link ports of the switch, the receiving/transmitting decision component 115 of the switch will interrupt the transmission of data frame of channel level M between the source user device and the transmission and determine that the data frame of channel level N between the source user device and the controlled object occupies the pair of paired network link ports of the switch so as to be transmitted immediately. In this way, the data communication of channel level N between the source user device and the controlled object can occupy the transmission channel to channel level N by channel level switching mechanism. Meanwhile, the interrupt mechanism can ensure the time efficiency of the control data transmission.

Based on the above description, the switch over Ethernet of the present invention can perform channel arbitration on a data frame to cause the channel attribute of the data frame from a user device associated with channel level 1 to be switched to from channel level 1 to channel level 2. The channel of the switch is dynamically chosen based on the channel attributes of data frame. In addition, the channel arbitration of the present disclosure adopts its own data exchange protocol and does not adopt the Ethernet standard priority protocol.

Since the switch of the present disclosure has dual-channels or multi-channels, channel arbitration can be performed based on the channel priority level. For example, data frame associated with high channel level and arriving in late can interrupt the transmission of the data frame associated with a low channel level. Further, the present invention allows the transmission sequences to be switched between the data frame associated with high channel level and the data frame associated with low channel level, which is achieved when a plurality of networks of different kinds are united, a performance not accomplished in Ethernets available at present. In the existing Ethernet, it is required to specially set up a line for transmitting data which are time sensitivity and time efficiency. However, the switch of the present disclosure eliminates such requirements so that a plurality of data frames with different time sensitive and efficiency requirements can be transmitted in one network and the data frame with high time sensitive and efficiency requirement will not be delayed. By using the dual-channels switch or multi-channels switch of the present disclosure to connect a plurality of networks so as to combine the plurality of network into one network, those data frames whose transmission time efficiency requirement is not high, such as voice or video data, and controlling data frames which need to be transmitted preferentially can be run on one network. Due to the dual-channels switch or multi-channels switch of the present disclosure, when the controlling data frame arrives, the transmission of ordinary data frame will be interrupted to wait for being transmitted normally after the controlling data frame queued in a fast channel with a high level is transmitted preferentially.

The transmission mode of the switch of the present disclosure is that the switch performs channel arbitration based on incoming a data frame so as to select a channel in which the incoming data frames will queue and the incoming data frames queuing in the selected channel are transmitted sequentially. Therefore, the switch of the present disclosure can verify the legality and validity of the channel data, judge the effectiveness and legitimacy of the channel, arbitrate the time reality and priority of the channel, and judge the attribute of the channel data and the routing assignment between the channels. Therefore, The switch of the present disclosure can allocate the transmission channel for the user device connected thereto based on the channel priority of a user device defined by the user, so that the data frame queued in the channel with the higher priority can be preferentially transmitted and the transmission of the data frame queued in the channel with the lower priority is interrupted at the same time, and a plurality of interrupted data frames belonging to an original data frame will be reassembled in the next neighbor switch. In particular, when transmission of data frame of one channel level is switched to transmission of data frame of another channel level, the switch of the present will perform confirmation and channel arbitration on the data frame of another channel level so as to prevent illegal channel level switching from interfering with current data transmission and realize that user devices associated with different channel levels can access to each other.

The switch of the present invention is a full-duplex switch having three-ports. Each packet contains a channel number and the level of the channel, instead of the data priority.

The basic principles of the present invention have been described in connection with the specific embodiments above, but it should be noted that those skilled in the art can understand that all or any of the steps or components of the method and apparatus of the present disclosure may be implemented in hardware, firmware, software, or a combination in a computing device (including a processor, a storage medium, etc.) or a network of computing devices thereof, which can be achieved by those skilled in the art by using their basic programming skills after reading the description of the present disclosure.

Therefore, the purpose of this disclosure can also be achieved by running a program or a set of programs on any computing device. The computing device can be a well-known general-purpose device. Accordingly, the purpose of the present disclosure can also be achieved by merely providing a program product comprising program code for implementing the method or apparatus. That is to say, such a program product also constitutes the present disclosure, and a storage medium storing such a program product also constitutes the present disclosure. It will be apparent that the storage medium may be any well-known storage medium or any storage medium that will be developed in the future.

It should also be noted that, in the apparatus and method of the present disclosure, the various components or steps can be decomposed and/or recombined. These decompositions and/or recombination shall be considered equivalent to this disclosure. Further, the steps of performing the above-described series of processing can be naturally performed in the describing order, but need not be performed in time order. Some steps may be performed in parallel or independently of one another.

The above specific embodiments are not to limit the scope of protection of the present disclosure. Those skilled in the art will understand that a variety of modifications, combinations, sub-combinations and substitutions can occur depending on design requirements and other factors. Any modifications, equivalent substitutions, and improvements made within the spirit and principles of this disclosure shall be covered by the scope of the present disclosure.

What is claimed is:

1. An Ethernet-based multi-channel switch comprising:
one or more local access ports for a user device;
at least one pair of paired network link ports;
a channel arbitration component, configured to determine a channel priority level to be assigned to each of data frames based on a higher level between a channel priority level of a source device and a channel priority level of a destination device, contained in each of the data frames received from the user device connected to the local access port or each of the data frames transmitted via the pair of paired network link ports and sequentially arrange the data frames, received from the user device and the paired network link ports, in a data queue of a corresponding channel according to the assigned channel priority levels; and
a routing decision component, configured to obtain the data frames in the data queue in an order of channel priority levels from high to low, and determines attributions of the data frames in each channel priority level based on routing information of the data frames, and based on the attributions of the data frames and the channel priority levels to which they belong to determine routing directions of the data frames.

2. The Ethernet-based multi-channels switch of claim 1, wherein the channel arbitration component directly assigns a channel priority level of a broadcast data frame and a channel priority level of an acknowledgement data frame for the broadcast data frame as a lowest channel priority level.

3. The Ethernet-based multi-channels switch of claim 1, wherein the channel arbitration component directly assigns a channel priority level of a broadcast data frame, a channel priority level of an acknowledgement data frame for the broadcast data frame, and a channel priority level of a subsequent confirmation data frame as the lowest channel priority level.

4. The Ethernet-based multi-channels switch of claim 1, wherein the routing decision component determines if the attribution of a data frame received from the local access port belongs to a network link port, and thereby bilaterally routes the data frames to the pair of the paired network link ports.

5. The Ethernet-based multi-channels switch of claim 1, wherein the routing decision component determines that the attribution of a broadcast data frame received via one network link port of the at least one pair of the paired network link ports is an access port for the user device and the other network link port of the at least one pair of the paired network link ports.

6. The Ethernet-based multi-channels switch of claim 1, wherein the routing decision component determines that the attribution of a data frame received via one network link port of the at least one pair of the paired network link ports is an access port for the user device or the other network link port of the at least one pair of the paired network link ports based on whether a destination address contained in the routing information of the data frame is the user device connected to the local access port or not.

7. The Ethernet-based multi-channels switch of claim 6, wherein the routing decision component determines to discard a data frame received via one link network port of a pair of the paired network link ports as a repeated data frame when
    determining that the data frame has been received once via the other network link port of the pair of the paired network link ports based on the data sequence number contained in the data frame.

8. The Ethernet-based multi-channels switch of claim 6, wherein the routing decision component determines to discard a data frame received via one link network port of a pair of the paired network link ports as a repeated data frame
    when determining that the data frame has been once received by the local user device based on the data sequence number contained in the data frame.

9. The Ethernet-based multi-channels switch of claim 1, further comprising:
    a receiving/transmitting decision component, configured to
        preferentially arrange transmission of the data frames with an assigned highest channel priority level and
        transmit the data frames with the next highest channel priority level after completing the transmission of the data frames with the current highest channel priority level.

10. The Ethernet-based multi-channels switch according to claim 9, wherein the receiving/transmitting decision component, when data frames with higher channel priority level than that of the data frame being transmitted is delivered via the routing decision component, approves the transmission request of the data frames with higher channel priority level, interrupts the transmitting of the data frame with lower channel priority level being transmitted, repackages a rest data portion of the interrupted data frame according to its original header data and arranges the repackaged data frame at a first place of the data queue to be transmitted which the data frame with lower channel priority level being transmitted belongs to.

11. The Ethernet-based multi-channels switch of claim 10, wherein the receiving/transmitting decision component,
    when determining that two or more consecutive data frames with a same channel priority level received via the channel arbitration component are valid interrupted data frames,
    reassembles the two or more valid interrupted data frames into one data frame and arranges the reassembled data frame at the end of the data queue which will enter into the routing decision component and has the channel priority level associated with the reassembled data frame.

12. The Ethernet-based multi-channels switch of claim 1, further comprising:
    a data legal verification component, configured to perform protocol check and CRC check on a received data frame to verify if the received data frame is legal.

13. The Ethernet-based multi-channels switch of claim 1, wherein the at least one pair of the paired network link ports are two pairs of the paired network link ports, wherein one pair of the paired network link ports is assigned to the channel with the higher channel priority level and the other pair of the paired network link ports are assigned to the channels with lower channel priority levels.

14. The Ethernet-based multi-channels switch of claim 1, wherein the at least one pair of the paired network link ports are two pairs of the paired network link ports, wherein one pair of the paired network link ports is assigned to the channels with the first and the second highest channel priority levels and the other pair of the paired network link ports is assigned to the channels with lower channel priority levels.

15. A method for performing data channel arbitration in an Ethernet switch, comprising:
    receiving a data frame from an access port for a user device or a network link port of the Ethernet-based multi-channel switch of claim 1;
    parsing a source device MAC address and a destination device MAC address contained in the received data frame and a channel priority level to which the received data frame belongs; and
    determining a channel priority level to be assigned to the received data frame based on the higher channel priority level between the channel priority level associated with the source user device and the channel priority level associated with the destination device which are contained in the received data frame and sequentially arrange the received data frame in a data queue in the channel with the assigned channel priority level.

16. The method for performing data channel arbitration in the Ethernet switch of claim 15, further comprising:
    determining a channel priority level of a broadcast or multicast data frame and a channel priority level of an acknowledgement data frame for the broadcast or multicast data frame as the lowest channel priority level.

17. The method for performing data channel arbitration in the Ethernet switch of claim 15, further comprising:
    directly assigning a channel priority level of a broadcast or multicast data frame, a channel priority level of an acknowledgement data frame for the broadcast or multicast data frame, and a channel priority level of a subsequent confirmation data frame as the lowest channel priority level.

18. The method for performing data channel arbitration in the Ethernet switch of claim 15, further comprising:
    directly assigning a channel priority level of a data frame which is received from a local user device and whose MAC address is not contained in the MAC address table of the switch as the lowest channel priority level; and
    for a channel priority level of a data frame which is received from a network link port and needs to be further forwarded, maintaining a forwarding channel of the data frame at the same channel priority level.

* * * * *